United States Patent
Simili et al.

(10) Patent No.: US 12,047,022 B2
(45) Date of Patent: Jul. 23, 2024

(54) FIELD WEAKENING REGULATOR FOR CVFR CURRENT REGULATOR

(71) Applicant: BorgWarner Inc., Auburn Hills, MI (US)

(72) Inventors: Dwarakanath V. Simili, Oakland Township, MI (US); Caleb W. Secrest, Noblesville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 17/492,766

(22) Filed: Oct. 4, 2021

(65) Prior Publication Data

US 2023/0106892 A1    Apr. 6, 2023

(51) Int. Cl.
*H02P 21/14* (2016.01)
*H02P 21/00* (2016.01)

(52) U.S. Cl.
CPC ........ *H02P 21/141* (2013.01); *H02P 21/0089* (2013.01)

(58) Field of Classification Search
CPC .......................... H02P 21/141; H02P 21/0089
See application file for complete search history.

(56) References Cited

U.S. PATENT DOCUMENTS

| | | | | |
|---|---|---|---|---|
| 2004/0100220 A1* | 5/2004 | Fu | ........................... | B60L 15/00 318/700 |
| 2010/0066283 A1* | 3/2010 | Kitanaka | .................. | H02P 4/00 318/400.02 |
| 2010/0164429 A1* | 7/2010 | Ide | ......................... | H02P 21/14 318/802 |
| 2011/0221367 A1* | 9/2011 | Perisic | .................... | H02P 27/12 318/400.02 |
| 2016/0141983 A1* | 5/2016 | Yim | ....................... | H02P 27/08 318/400.02 |
| 2020/0114900 A1 | 4/2020 | Lee et al. | | |
| 2020/0127588 A1 | 4/2020 | Secrest et al. | | |
| 2022/0014132 A1* | 1/2022 | Yu | ....................... | H02P 21/0089 |

OTHER PUBLICATIONS

Secrest et al. "Symmetric DQ Control of Saturated Salient AC Machines—Utilizing Targeted Time Constant Virtual Resistance and Complex Vector Flux-Linkage Regulation," 2020 IEEE Energy Conversion Congress and Exposition (ECCE), 2020, pp. 2411-2418, doi: 10.1109/ECCE44975.2020.9235396.

* cited by examiner

*Primary Examiner* — Kawing Chan
(74) *Attorney, Agent, or Firm* — CANTOR COLBURN LLP

(57) ABSTRACT

A method of controlling a motor controlled by a motor controller that includes a complex vector flux regulator (CVλR). The method includes: receiving at a field weakening regulator of the motor controller a modulation index that is a scaled version of an available voltage available to be provided to the motor by a voltage source; comparing the modulation index to a feedback modulation index to produce an error scalar that has a magnitude in a flux domain; determining a final direction ($\alpha_{final}$) of the error scalar in the flux domain; and providing the CVλR with flux commands in the d and q domain based on the error scalar and the direction.

14 Claims, 5 Drawing Sheets

FIELD WEAKENING REGULATOR FOR CVFR CURRENT REGULATOR

BACKGROUND OF THE INVENTION

Exemplary embodiments pertain to the art of current regulators for alternating current motors and, in particular, to a field weakening regulator for use in such regulators.

Modern hybrid and electric vehicle (EV) applications require alternating current (AC) machines with high power densities and wide speed operating ranges. To achieve this, interior permanent magnet synchronous machines (IPMSM) have been widely used in the automotive industry. However, these high-performance IPMSMs are capable of being pushed into deep electromagnetic saturation and can, therefore, have operating conditions that are non-linear.

Such motors are controlled by complex vector current regulator (CVCR). By representing two scalar states in a single complex vector notation the CVCR reduces the current regulator system to a single-input-single-output system thereby enabling simplified analysis and modeling. However, the CVCR was only developed in the continuous-time domain for unsaturated symmetric 3-phase loads. Later, a vector implementation of the continuous-time domain CVCR was extended to asymmetric AC machines.

Most recently, a flux-linkage-based regulator (CVλR) has been proposed to address discrete-time control of saturated asymmetric machines using state-space methods. A benefit of the CVλR is that it provides an even higher level of physical insight than prior method.

One method to control such a motor is by using a vector-controlled pulse width modulated (PWM) voltage source inverter to excite the IPMSM. Using this approach provides accurate torque control, improved dynamic response, and increased motor efficiency. Reducing the magnetic flux inside the motor, which is also called flux or field weakening, may provide improved power characteristics of the motor at higher speeds. Flux weakening in a PM motor can be accomplished by adjusting the stator excitation.

BRIEF DESCRIPTION OF THE INVENTION

Disclosed is a method of controlling a motor controlled by a motor controller that includes a complex vector flux regulator (CVλR). The method includes: receiving at a field weakening regulator of the motor controller a modulation index that is a scaled version of an available voltage available to be provided to the motor by a voltage source; comparing the modulation index to a feedback modulation index to produce an error scalar that has a magnitude in a flux domain; determining a final direction ($\alpha_{final}$) of the error scalar in the flux domain; and providing the CVλR with flux commands in the d and q domain based on the error scalar and the direction.

A system that includes a memory having computer readable instructions and one or more processors for executing the computer readable instructions, the computer readable instructions controlling the one or more processors to perform operations related to the methods disclosed herein is also disclosed.

Also disclosed is an internal permanent magnet motor. The motor includes a stator, a rotor, an inverter and a motor controller. The motor controller includes a complex vector flux regulator (CVλR) configured to: receive at a field weakening regulator of the motor controller a modulation index that is a scaled version of an available voltage available to be provided to the motor by a voltage source; compare the modulation index to a feedback modulation index to produce an error scalar that has a magnitude in a flux domain; determine a final direction ($\alpha_{final}$) of the error scalar in the flux domain; and provide the CVλR with flux commands in the d and q domain based on the error scalar and the direction to control operation of the motor via the inverter.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Modern hybrid and electric vehicle applications require alternating (AC) machines with high power densities and wide speed operating ranges. To meet these requirements, interior permanent magnet synchronous machines (IPMSM) have been widely used in industry. These high-performance IPMSMs are capable of operating in deep electromagnetic saturation. Operating in deep electromagnetic saturation can result in significant non-linearities that must be considered in control. Reducing the magnetic flux inside the motor, which is also called flux or field weakening, may provide improved power characteristics of the PM motor at higher speeds. Flux weakening in a PM motor can be accomplished by adjusting the stator excitation. The prior art is limited in the torque accuracy provided during field-weakening.

Embodiments herein can address one or both by providing a field weakening controller for a CVλR regulator. In one embodiment, this can be accomplished by having a controller that operates in the flux domain as opposed to the current domain. That is, the control variables are flux plane variables $\lambda_d$ and $\lambda_q$ as opposed to the prior art that operates in the current domain with $i_d$ and $i_q$. By operating in the flux domain/plane, the voltage limit can be modelled as a circle rather than an ellipse leading to easier calculations in some cases.

In one embodiment, such control can be accomplished by applying a small signal linearization of torque loci and voltage limits. This removes control from the current domain and can allow for compensation in the voltage domain.

Figure 1:
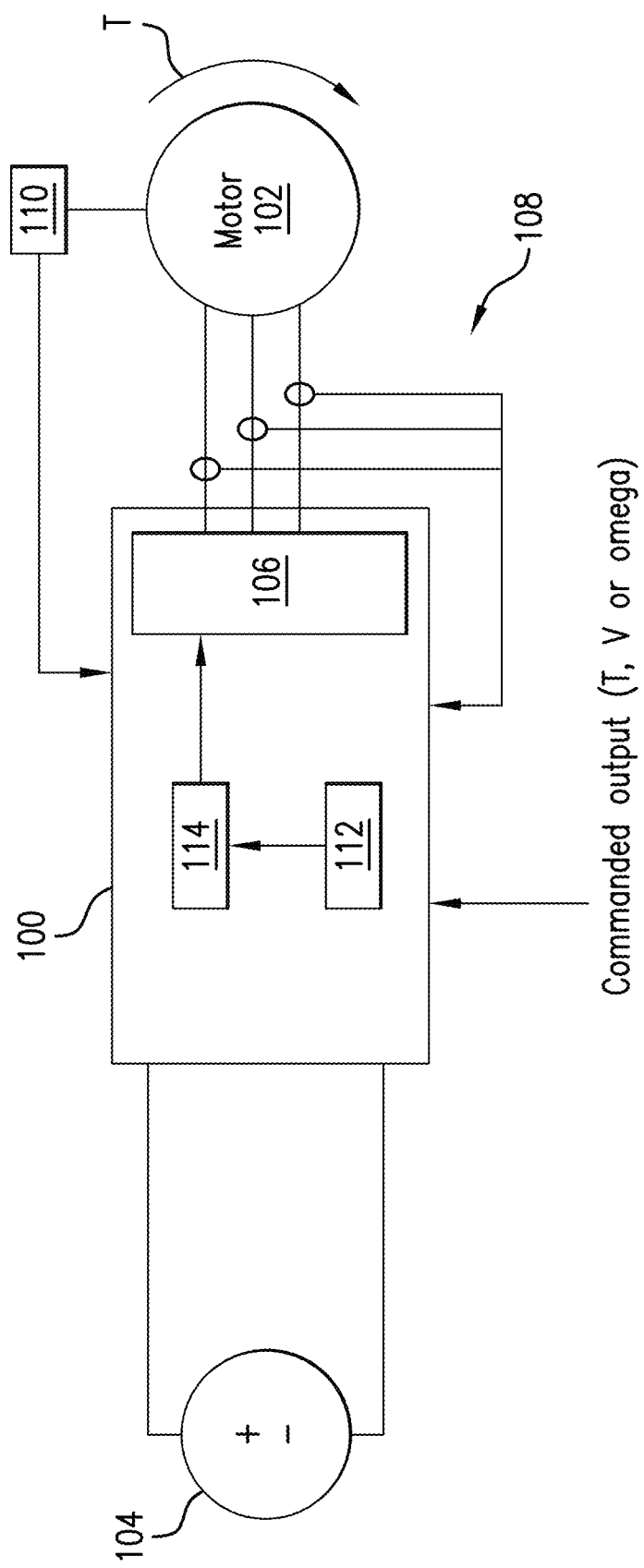
FIG. 1 depicts a system that includes a field weakening regulator according to embodiments disclosed herein.

With reference now to FIG. 1, a motor control system 100 (controller) is shown that controls operation of motor 102. The motor 102 can produce output torque as generally indicated by arrow T (or course, the torque could be delivered in the opposite direction). The motor controller 100 can receive DC power from a DC power source 104 such as a battery or other DC power storage element. In general, the motor controller 100 will convert the DC power to an AC output and provide it to the motor 102. As shown, the motor controller 100 provide 3 phase AC power to the motor 102. To that end, the motor controller 100 can include power electronics 106 that convert the DC power to AC power. The motor controller 100 receives at least a current provided to the motor via sensors 108, a commanded operating mode (e.g., in voltage, torque or speed (ω)) and optionally a motor position as measure by a position sensor 110. Other elements can be included in the motor controller 100 as will be understood based on the disclosure herein. Embodiments disclosed herein are directed to providing a field weakening controller 112 that can influence operation of the power electronics 106. The field weakening controller 112 provides a field weakening output in the flux plane ($\lambda_{dq}$) (d and q planes) to the CVλR current regulator 114 that in turn, commands the power electronics 106.

Figure 3:
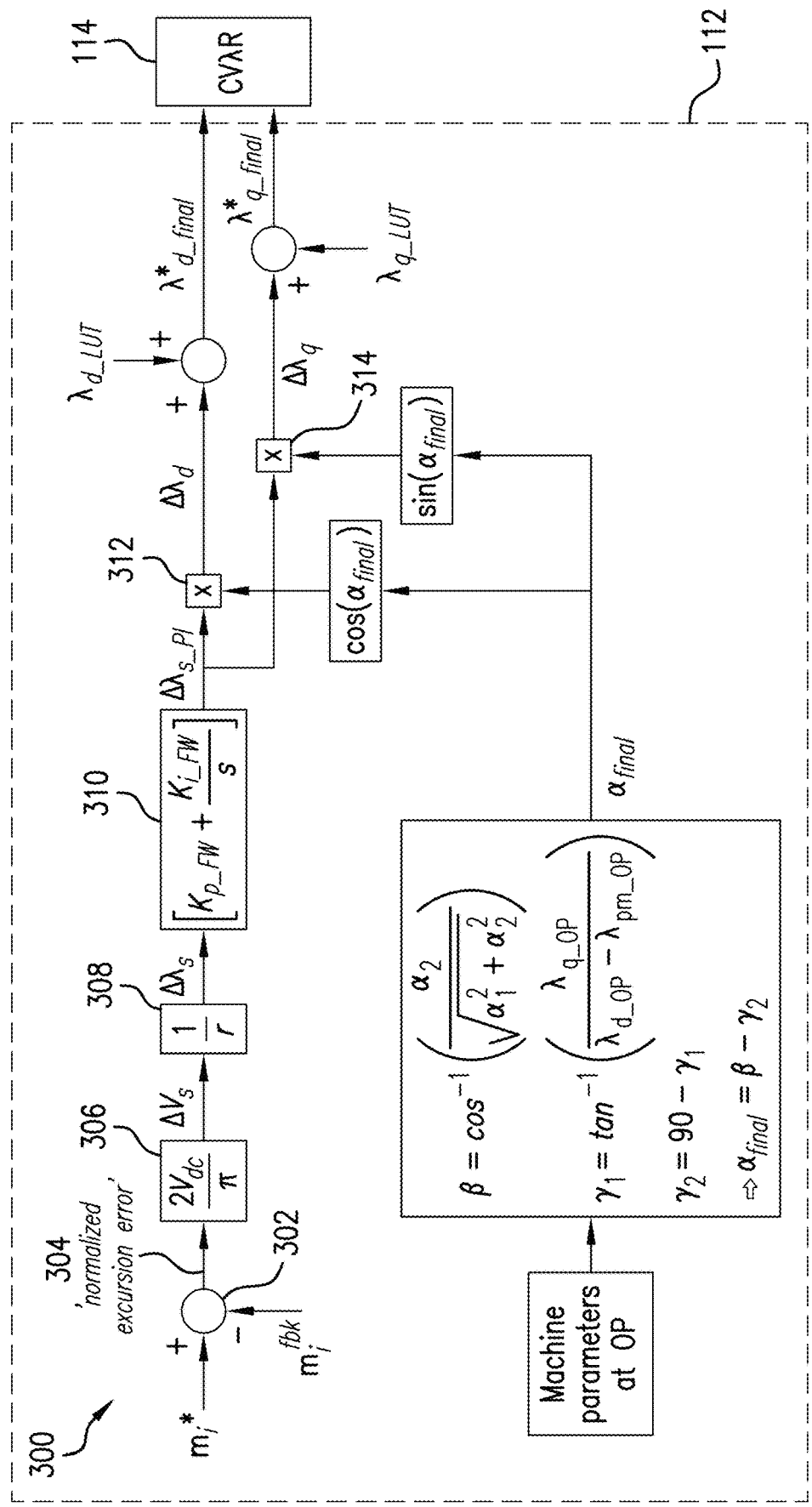
FIG. 3 depicts a control diagram according to one embodiment.

The following discussion will provide operational constraints and explanation of how the controller 112 operates. During that discussion reference can be made to FIG. 3 which shows a block diagram of field weaking controller 112 according to one embodiment. As shown in FIG. 3, the regulator is a proportional integral (PI) regulator.

The controller 112 is, as discussed above, a field weakening controller for CVλR regulator 114. In one embodiment, the control structure and theory of the controller 112 is analogous to well established current (Id/Iq) theory. The controller 112 can be based off small signal derivations of Voltage limit and Torque loci f(λd, λq) in one embodiment. This can help address one or both of non-linearities due to saturation and temperature.

Figure 2:
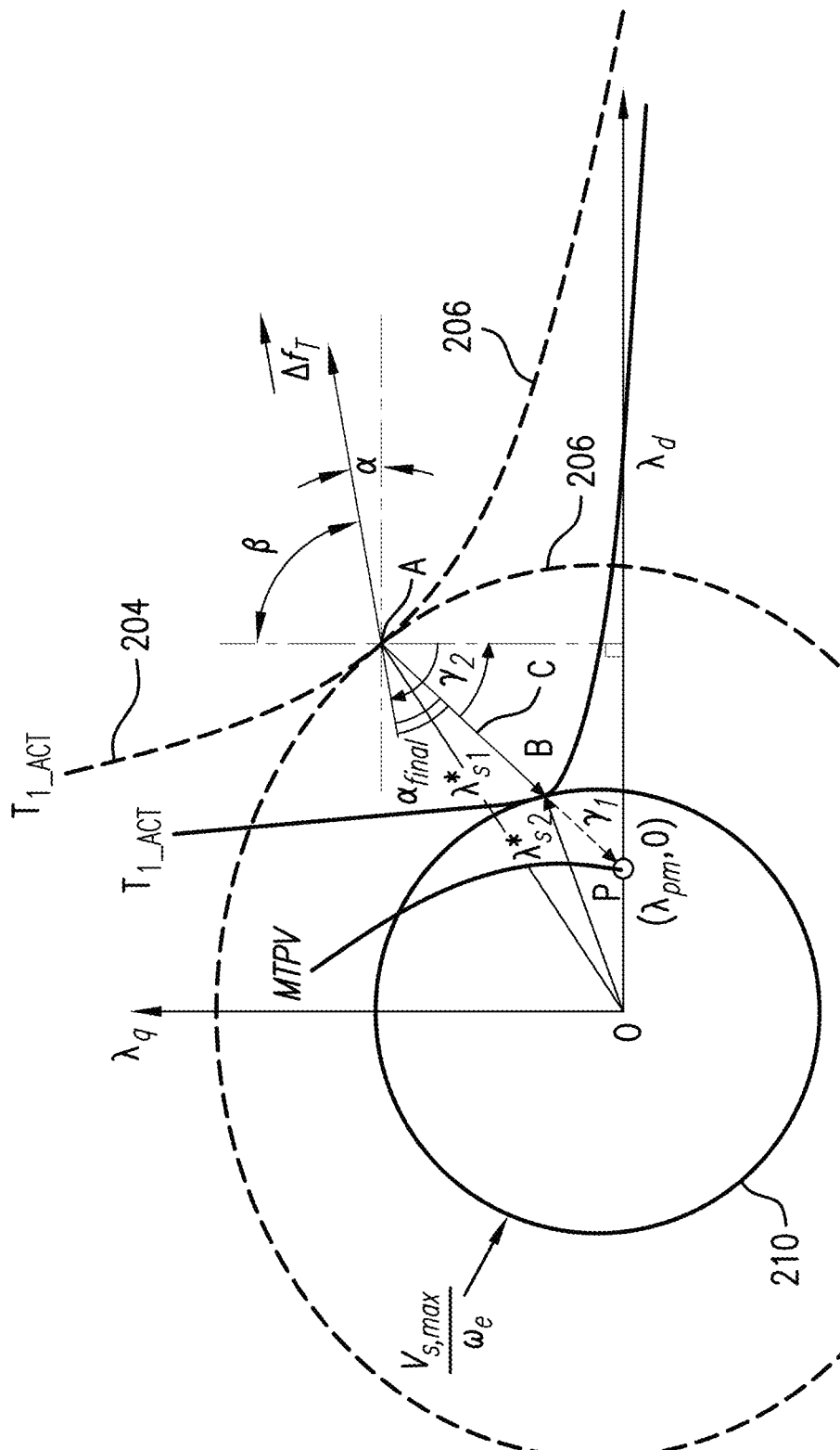
FIG. 2 depicts a graphical example of a control situation that embodiments herein may correct.

FIG. 2 is graphic representation of a solution that embodiments herein can provide. This representation is shown in flux plane ($\lambda_d$, $\lambda_q$). In FIG. 2, it shall be assumed that the motor controller 100 has received a signal that requests a desired torque output. That torque is located on a torque curve 204 for the motor. For each given point, there is particular voltage that is needed to achieve the requested torque. This is shown by intersection of the torque curve 204 for the motor with the required input voltage 206 that is needed to achieve that torque. In this example, that point is shown as point A. The torque curve 204 can be from a look-up table and can also be referred to as $T_{1\_LUT}$.

Embodiments herein take advantage of the discovery that in the flux plane, the voltage limit (e.g., requested voltage) is a circle when stator resistance (Rs) is neglected. In some instances, point A may exist at a point that cannot be achieved by the motor controller 100 (e.g., the inverter). For example, in FIG. 2, while the torque curve 204 for the requested torque may result in required input voltage 206, that voltage may be greater than the voltage limit that can be provided in operation. That limit is shown as the actual voltage limit 210 and represents the maximum voltage that the inverter (power electronics) can provide to the motor based on current operating conditions. The actual voltage limit can be represented as $v_{smax}/\omega_e$ where $v_{smax}$ is the maximum voltage that can be provided to the motor by the power source 104 of FIG. 1. In some cases $v_{smax}$ is less than the total power that the power source 104 can provide as that power source 104 may be providing power to multiple devices. Determination of $v_{smax}$ is known in the art and not discussed further herein.

In such a case, embodiments herein provide a controller that converts the operating point from the requested point (point A) that may not be achievable due to inverter voltage constraints to a point (point B) that can be attained with the given available power based on current operating conditions. To make this conversion a vector C is utilized. That vector has both a magnitude and a direction. Herein the direction shall be based off of two components α and β and may be referred to as $\alpha_{final}$. Derivation of $\alpha_{final}$ is explained in further detail below.

FIG. 3 shows a control diagram 300 of a field weaking controller 112. This control diagram can be implemented as soft or firmware within the controller 112. As indicated in numerous locations, the direction $\alpha_{final}$ is used to adjust the flux commands $\lambda_{d\_final}$, $\lambda_{q\_final}$ provided to the CVλR 114. Herein, because the calculations are performed in the $\lambda_d$, $\lambda_q$ plane, by using voltage with its circular shape, accurate determinations can be made. The following discussion will refer to FIG. 3 and may from time to time provide background calculations to achieve the feedback control provided by the controller 112.

The regulator 300 receives at least two inputs, $m_i^*$ and $m_i^{fbk}$. $m_i^*$ is the modulation index and is a scaled version of available voltage (e.g., from power source 104 of FIG. 1). $m_i^{fbk}$ is a feedback scaled modulation index of a measured electrical parameter (e.g., a voltage or current) that is currently being provided to the motor and is used to detect situations where commanded torque/voltage is too high. For example, if the motor controller 100 commands a voltage greater than $m_i^*$ the field weaking controller will reduce the magnitude and give the correct direction to result in an achievable operating condition.

In FIG. 3, the magnitude is adjusted by subtracting $m_i^{fbk}$ from $m_i^*$ as indicated at block 302 to create a normalized excursion error 304. This error can be scaled by scalars 306, 308. As shown, the voltage scalar 306 converts the error to a scalar voltage value (AV) that is then converted to a needed flux change (e.g., the magnitude of vector C of FIG. 1) by applying a conversion factor 1/r as indicated by scalar 308. The needed flux change can be called an error scalar and referred to as $\Delta\lambda_s$ herein. In this example, the voltage scalar 306 is $2V_{dc}/\pi$ where $V_{dc}$ is the available inverter DC voltage. Also, the term r is a scalar that is based on a time constant ($\tau_{mod}$) of the machine. Derivation of that term is more fully explained in U.S. Patent Application 20200127588 which is incorporated herein by reference, and the time constant is calculated as a selected ratio $K_e$ multiplied by a sampling period $T_s$.

$$\vec{\Delta f_1} = a_1 \Delta\lambda_d + a_2 \Delta\lambda_q$$

The above formula is based on the electromagnetic torque ($T_e$) of an IPM:

$$T_e = \frac{3P}{2}[\lambda_m i_q + (L_d - L_q)i_d i_q] \quad (1)$$

where P and $\lambda_m$ are the number of poles and PMs flux linkage, respectively. Lq, Ld, $i_q$ and $i_d$ are Q and D-axis inductances and current components, respectively. The flux vectors and their relationships to the current domain can be represented as shown below:

$$i_q = \frac{\lambda_q}{L_q}; i_d = \frac{\lambda_d - \lambda_m}{L_d}.$$

Making a conversion to the flux domain based on the above relationships results in following equation:

$$T_e = \frac{3P}{2}\left[\frac{\lambda_m}{L_d}\lambda_q + \left(\frac{L_d - L_q}{L_d L_q}\right)\lambda_q \lambda_d\right]$$

stated differently, $$f_T(\lambda_d, \lambda_q) \triangleq \frac{2T_e}{3P} = \frac{\lambda_m}{L_d}\lambda_q + \left(\frac{L_d - L_q}{L_d L_q}\right)\lambda_q \lambda_d$$

where $f_T$ is a function of the two variables $\lambda_d$, $\lambda_g$. To approximate the change is $f_T$ due to $\lambda_d + \Delta\lambda_d$ and $\lambda_q + \Delta\lambda_q$. Using differentials:

$$\Delta f_T = \frac{\partial f_T}{\partial \lambda_d}\Delta\lambda_d + \frac{\partial f_T}{\partial \lambda_q}\Delta\lambda_q$$

and thus:

$$\Delta f_T = \left(\frac{L_d - L_q}{L_d L_q}\right)\lambda_q \bigg|_{OP} \Delta\lambda_d + \left(\frac{\lambda_m}{L_d} + \left(\frac{L_d - L_q}{L_d L_q}\right)\lambda_d\right)\bigg|_{OP} \Delta\lambda_q$$

at the operating point (OP).

Based on the above derivation it can be seen that:

$$a_1 = \left(\frac{L_d - L_q}{L_d L_q}\right)\lambda_q \bigg|_{OP} \text{ and } a_2 = \left(\frac{\lambda_m}{L_d} + \left(\frac{L_d - L_q}{L_d L_q}\right)\lambda_d\right)\bigg|_{OP}$$

Figure 4:
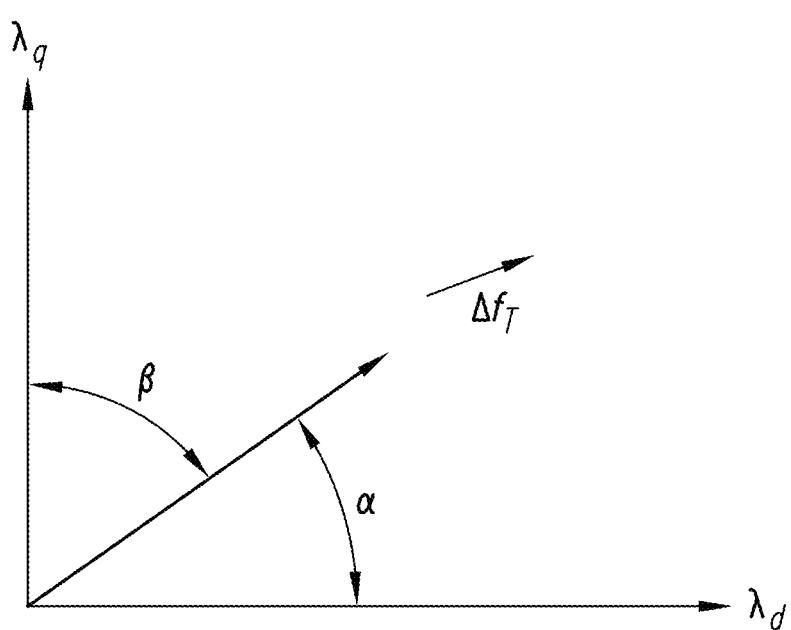
FIG. 4 illustrates an example of a vector (with magnitude and direction) that embodiments a solution provided herein.

From the above it shall be understood that based on FIG. 4:

$$\cos(\alpha) = \frac{a_1}{\sqrt{a_1^2 + a_2^2}} \text{ and } \cos(\beta) = \frac{a_2}{\sqrt{a_1^2 + a_2^2}}$$

Figure 5:
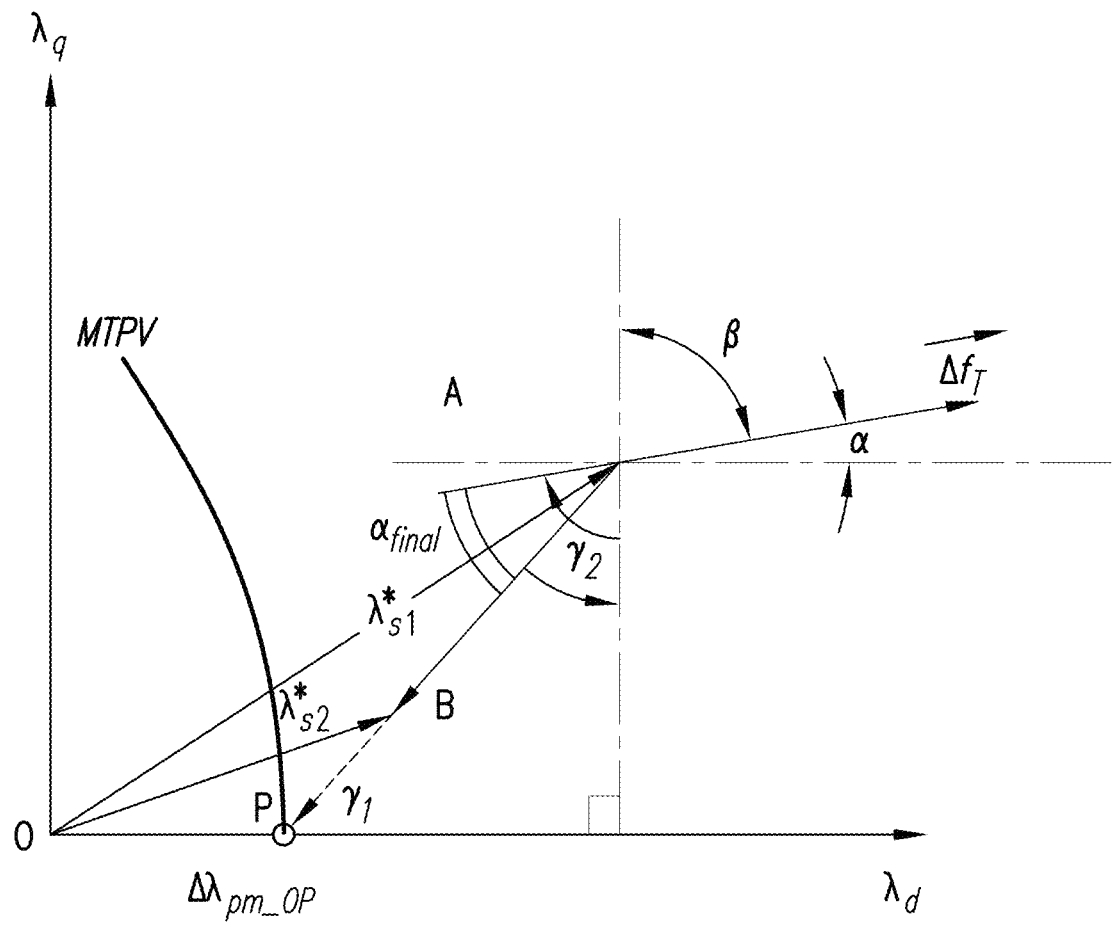
FIG. 5 shows a simplified version of FIG. 3 for clarity.

Reference can now be made to FIG. 5 which shows certain angles that direct $\Delta f_T$ from point A to point B (e.g., orient vector C based on $\alpha$ and $\beta$). In particular, $$\beta = \cos^{-1}\left(\frac{a_2}{\sqrt{a_1^2 + a_2^2}}\right) \alpha = \cos^{-1}\left(\frac{a_1}{\sqrt{a_1^2 + a_2^2}}\right)$$

$$\gamma_1 = \tan^{-1}\left(\frac{\lambda_{q\_OP}}{\lambda_{d\_OP} - \lambda_{pm\_OP}}\right)$$

$$\gamma_2 = 90 - \gamma_1$$

$$\alpha_{final} = \beta - \gamma_2$$

In FIG. 5 and above, _OP refers to the location at the operating point and $\Delta\lambda_{pm\_OP}$ is based on the MTPV line of the machine (a known variable). $\lambda_{q\_OP}$ and $\lambda_{d\_OP}$ are determined from pre-determined look up tables based on currents (Id and Iq) and rotor temperature Referring back to FIG. 3, after $\Delta\lambda_s$ is created, it is provided to a PI controller 310 to create a needed flux change for controlling the motor ($\Delta\lambda_{sPf}$) That value then is converted into d and q components ($\Delta\lambda_d$ and $\Delta\lambda_q$) by multiplying by the cosine and sine of final direction of the vector ($\alpha_{final}$) in boxes 312, 314. These values can then be "subtracted" from the look up table based $\lambda_d$, $\lambda_q$ that created the torque curve 206 for the originally requested torque to produce corrected, final commands $\lambda_{d\_final}$, $\lambda_{q\_final}$ that are provided to the CVλR 114.

It shall be noted that as shown in FIG. 4, the determination of $\alpha_{final}$ is based on the operating conditions of the machine at the desired but unattainable operating point. That is, the original torque/voltage can be commanded but an actual voltage/current may be achieved.

The term "about" is intended to include the degree of error associated with measurement of the particular quantity based upon the equipment available at the time of filing the application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method of controlling a motor controlled by a motor controller that includes a complex vector flux regulator (CVλR), the method comprising:
   receiving at a field weakening regulator of the motor controller a modulation index that is a scaled version of an available voltage available to be provided to the motor by a voltage source;
   comparing the modulation index to a feedback modulation index to produce an excursion error;
   applying a voltage scalar to convert the excursion error to a scalar voltage that is then converted to an error scalar that has a magnitude in a flux domain of the motor, wherein the scalar voltage is converted by applying a conversion factor 1/r where r is a scalar that is based on a time constant of the motor;
   determining a final direction ($\alpha_{final}$) of the error scalar in the flux domain; and
   providing the CVλR with flux commands in d and q domain of the flux domain based on the error scalar and the final direction for controlling the motor;
   wherein the time constant is calculated as a selected ratio Ke multiplied by a sampling period Ts for the motor.

2. The method of claim 1, wherein the final direction is determined in the flux domain and is based on the available voltage which can be represented as a circle in the flux domain.

3. The method of claim 1, further comprising:
   providing the error scalar to a proportional integral controller to produce needed flux change for controlling the motor ($\Delta\lambda_{sPI}$).

4. The method of claim 3, wherein the needed flux change is converted into d and q components ($\Delta\lambda_d$ and $\Delta\lambda_q$).

5. The method of claim 4, wherein the d and q components ($\Delta\lambda_d$ and $\Delta\lambda_q$) are based off of cosine and sine of the direction.

6. A system comprising:
   a memory having computer readable instructions; and
   one or more processors for executing the computer readable instructions, the computer readable instructions controlling the one or more processors to perform operations comprising:
   receiving at a field weakening regulator of a motor controller of a motor a modulation index that is a scaled version of an available voltage available to be provided to the motor by a voltage source;
   comparing the modulation index to a feedback modulation index to produce an excursion error;
   applying a voltage scalar to convert the excursion error to a scalar voltage that is then converted to an error scalar that has a magnitude in a flux domain of the motor, wherein the scalar voltage is converted by applying a conversion factor 1/r where r is a scalar that is based on a time constant of the motor;
   determining a final direction ($\alpha_{final}$) of the error scalar in the flux domain; and providing a complex vector flux regulator (CVλR) of the motor controller with flux commands in d and q domain of the flux domain based on the error scalar and the final direction for controlling the motor;

wherein the time constant is calculated as a selected ratio Ke multiplied by a sampling period Ts for the motor.

7. The system of claim 6, wherein the final direction is determined in the flux domain and is based on the available voltage which can be represented as a circle in the flux domain.

8. The system of claim 6, wherein the computer readable instructions control the one or more processors to further perform operations comprising:

providing the error scalar to a proportional integral controller to produce needed flux change for controlling the motor ($\Delta\lambda_{sPI}$).

9. The system of claim 8, wherein the needed flux change is converted into d and q components ($\Delta\lambda_d$ and $\Delta\lambda_q$).

10. An internal permanent magnet motor comprising:
a stator;
a rotor;
an inverter; and
a motor controller that includes a complex vector flux regulator (CVλR) configured to:
receive at a field weakening regulator of the motor controller a modulation index that is a scaled version of an available voltage available to be provided to the motor by a voltage source;
compare the modulation index to a feedback modulation index to produce an excursion error;
apply a voltage scalar to convert the excursion error to a scalar voltage that is then converted to an error scalar that has a magnitude in a flux domain of the motor, wherein the scalar voltage is converted by applying a conversion factor 1/r where r is a scalar that is based on a time constant of the motor;
determine a final direction ($\alpha_{final}$) of the error scalar in the flux domain; and
provide the CVλR with flux commands in d and q domain of the flux domain based on the error scalar and the final direction to control operation of the motor via the inverter;
wherein the time constant is calculated as a selected ratio Ke multiplied by a sampling period Ts of the motor.

11. The system of claim 10, wherein the final direction is determined in the flux domain and is based on the available voltage which can be represented as a circle in the flux domain.

12. The system of claim 11, wherein the motor controller is further configured to provide the error scalar to a proportional integral controller to produce needed flux change for controlling the motor ($\Delta\lambda_{sPI}$).

13. The system of claim 12, wherein the needed flux change is converted into d and q components ($\Delta\lambda_d$ and $\lambda\lambda_q$).

14. The system of claim 13, wherein the d and q components ($\Delta\lambda_d$ and $\Delta\lambda_q$) are based off of cosine and sine of the final direction.

* * * * *